United States Patent [19]

Herchenbach et al.

[11] Patent Number: 4,917,406
[45] Date of Patent: Apr. 17, 1990

[54] LENGTH-ADJUSTABLE HOLDING DEVICE FOR THE LOWER STEERING ARM OF A THREE-POINT COUPLING DEVICE

[75] Inventors: Paul Herchenbach, Ruppichteroth; Alfred Frackenpohl, Lohmar; Hermann Rugen, Meppen-Rühle, all of Fed. Rep. of Germany

[73] Assignee: Jean Walterscheid GmbH, Lohmar, Fed. Rep. of Germany

[21] Appl. No.: 326,320

[22] Filed: Mar. 21, 1989

[51] Int. Cl.$^4$ ............................................. A01B 59/043
[52] U.S. Cl. ................................. 280/455.1; 280/474; 172/450
[58] Field of Search ............... 280/455.1, 456.1, 460.1, 280/474; 172/439, 450, 457

[56] References Cited

U.S. PATENT DOCUMENTS

| | | | |
|---|---|---|---|
| 2,775,180 | 12/1956 | DuShane | 172/450 |
| 3,056,458 | 10/1962 | Gray | 172/450 |
| 3,250,524 | 5/1966 | Boatright | 172/450 |
| 4,470,613 | 9/1984 | Sykes | 172/450 |

Primary Examiner—Charles A. Marmor
Assistant Examiner—Donn McGiehan
Attorney, Agent, or Firm—Toren, McGeady & Associates

[57] ABSTRACT

The invention relates to a length-adjustable holding device (5) for supporting the lower steering arms of a three-point coupling device of an agricultural tractor. The holding device (5) comprises a helical spring (6) and an adjusting member (9). The spring and adjusting member are connectable to each other by means of through-bores (10) in the adjusting member (9) and a pin (11) insertable between two coils (6a, 6b) of the helical spring (6). The axes (12) of the through-bores (10) extend at an angle and the distance between the bores (10) differs from the pitch of the two coils (6a, 6b) in order to achieve a fine length adjustment. The adjusting member (9) is guided via a guiding projection (15) in a bore (16) of a guiding sleeve (14) which is received in the cavity of the helical spring (6) so as to be non-rotatable and axially unmovable.

10 Claims, 4 Drawing Sheets 4,917,406

LENGTH-ADJUSTABLE HOLDING DEVICE FOR THE LOWER STEERING ARM OF A THREE-POINT COUPLING DEVICE

BACKGROUND OF THE INVENTION

Field of the Invention

This invention relates to a length-adjustable holding device with a resilient support for the lower steering arm of a three-point coupling device for an agricultural tractor, having a helical spring comprising a first connecting element, and an adjusting member adjustable received in the helical spring and comprising a second connecting member, with a pin being provided to secure the position of the adjusting member relative to the helical spring, which pin passes through the space between two spring coils and engages a bore of the adjusting member.

In order to change the effective length between the connecting elements of such prior art holding devices it is necessary to unfasten a connecting element to be able to rotate the adjusting member relative to the helical spring. This operation is complicated and requires a great deal of force.

There is a further disadvantage in that, due to the above way of operating, accurate adjustment is difficult because repeated unfastening of the connecting element would be necessary in order to find the accurate distance. Finally, the spring may disadvantageously be bent so that accurate guidance of the lower steering arm is not ensured.

Is it therefore the object of the invention to provide a holding device which ensures accurate guidance of the lower steering arm and whose length may be accurately set to the required dimension without having to unfasten the connecting element.

SUMMARY OF THE INVENTION

The invention provides a length-adjustable holding device with a resilient support for the lower steering arm of a three-point coupling device for an agricultural tractor, having a helical spring comprising a first connecting element, and an adjusting member adjustable received in the helical spring and comprising a second connecting member, with a pin being provided to secure the position of the adjusting member relative to the helical spring, which pin passes through the space between two spring coils and engages a bore of the adjusting member, wherein the adjusting member is designed with at least two through-apertures for a pin, the axis of each through-aperture extends at an angle relative to a plane transverse to the longitudinal axis of the helical spring, which angle substantially corresponds in size to the helical angle of the helical spring, the distance between the through-apertures differs from that between the coils of the helical spring, and the adjusting member is guided in a guiding bore of a guiding sleeve accommodated within the helical spring.

The term "helical angle" is used herein to denote the gradient of the helical spring, i.e. the angle between a plane transverse to the longitudinal axis of the spring and a tangent to the centre-line of a coil.

The holding device in accordance with the last preceding paragraph provides double support for the pin so that higher forces can also be accommodated. Furthermore, by arranging the through-apertures at a distance which differs from the distance between the coils of the helical spring, accurate positioning becomes possible.

An effect similar to the Vernier effect is achieved. Finally, by guiding the adjusting member in a guiding sleeve, the holding device is prevented from bending.

The special design and arrangement of the through-apertures and the pin permits adjustment without the connecting ends having to be disconnected from the associated components.

In a further embodiment of the invention, the adjusting member, which may be designed, at least partially as a round bar, comprises a guiding projection designed as a profiled bar, especially with a hexagonal cross-section, which may be moved into the correspondingly formed bore of the guiding sleeve. By designing the guiding projection as a profiled bar it is possible to obtain a large number of small faces which during operation in the fields and at low temperatures ensure that parts cannot freeze together.

The guiding sleeve may be held relative to the helical spring so as to be axially fixed or non-rotatable or rotatable to a limited extent only.

As a rule, three through-apertures are sufficient in order to achieve a sufficiently fine graduation in adjusting the distances.

Preferred arrangements are envisaged for the holding device, either for supporting the two lower steering arms of a three-point coupling device of an agricultural tractor relative to each other or for supporting a lower steering arm relative to the agricultural tractor, especially its axle housing.

For attaching the holding device, the one end of the helical spring may be designed as a hook to be connected to an eye of the lower steering arm or agricultural tractor. For fixing the end of the adjusting member projecting from the helical spring, this end, for the purpose of forming the connecting element, may be bent and designed as a cylindrical journal which may be inserted into an eye at the lower steering arm or at the agricultural tractor.

BRIEF DESCRIPTION OF THE DRAWINGS

A preferred embodiment of the invention and different alternatives for arranging the holding device in accordance with the invention are schematically illustrated in the drawings wherein.

DESCRIPTION OF PREFERRED EMBODIMENTS

Figure 1:
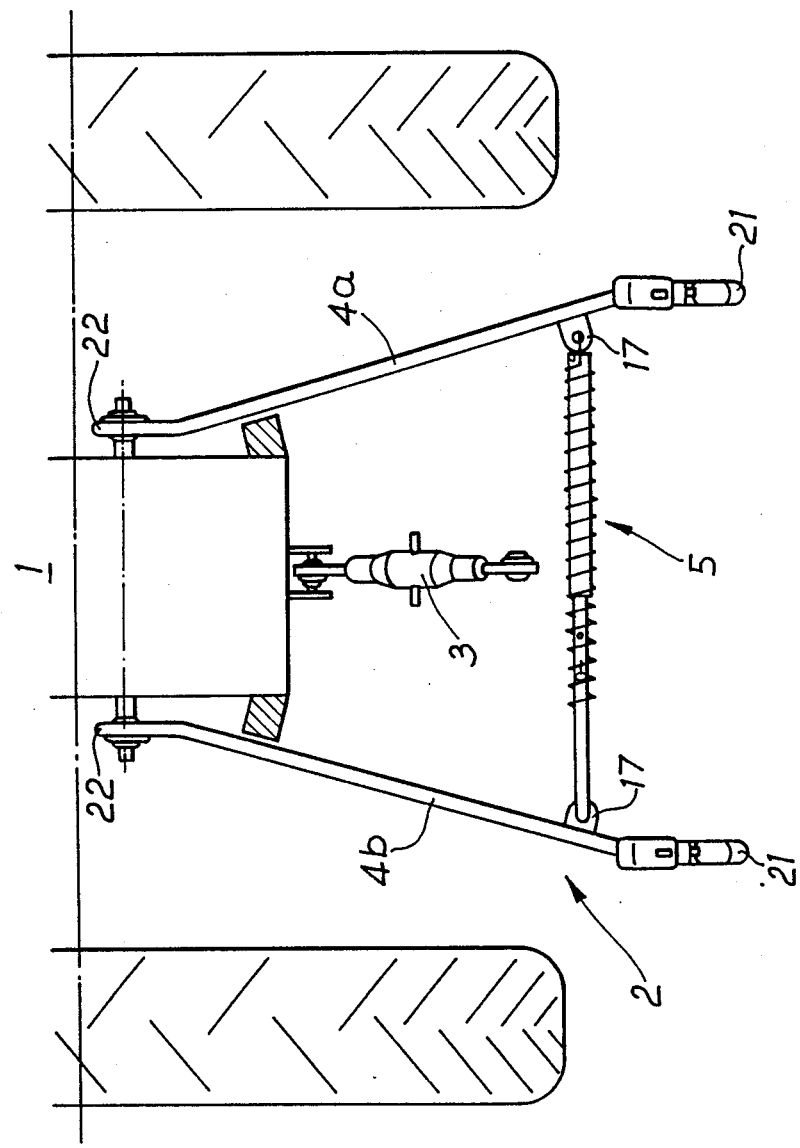
FIG. 1 is a plan view of the rear end of a tractor with a three-point coupling device, with the holding device in accordance with the invention being arranged between the lower steering arms.

FIG. 1 shows a diagrammatic view of an agricultural tractor 1, especially its rear end comprising a three-point coupling device 2. The three-point coupling device 2 comprises an upper steering arm 3 to be connected to an upper articulation point of an implement to be attached and two lower steering arms 4a and 4b connected to the rear end of the tractor by means of ball joints 22. At their free ends, the two lower steering arms 4a and 4b have been provided with catching hooks 21 which catch the lower articulation points of the implement to be attached.

By means of a holding device 5 whose ends engage eyes 17 attached to the lower steering arms 4a and 4b, the two lower steering arms 4a and 4b are held at a distance relative to each other which is adjustable. Starting from the preferred position, which is the set position, it is possible to effect a lateral articulation or change in length within the limits of length changes of the spring.

Figure 2:
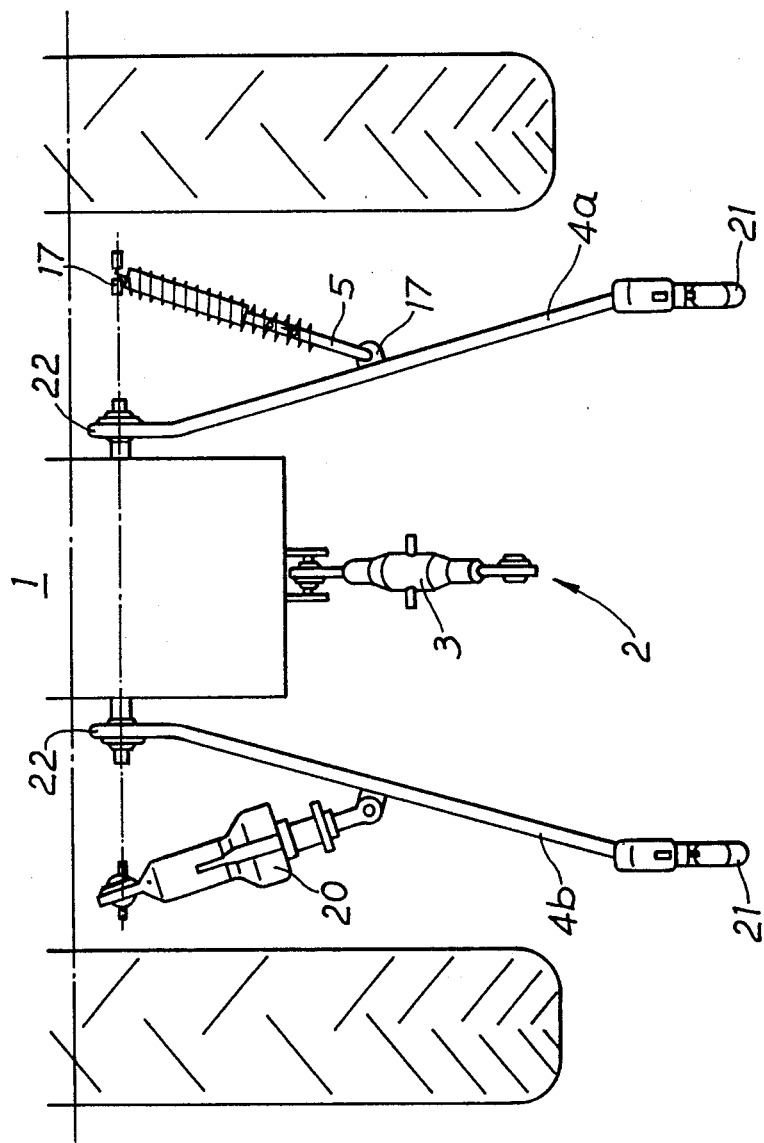
FIG. 2 is a plan view similar to FIG. 1, with a lower steering arm being laterally supported by a holding device in accordance with the invention relative to the tractor.

FIG. 2 shows an assembly similar to that of FIG. 1, but with the holding device 5 being associated with one lower steering arm 4a only, i.e. the holding device 5 laterally supports the lower steering arm 4a relative to the tractor 1, especially its axle housing. Again, fixing is effected via eyes 17 at the lower steering arm 4a or the tractor 1 respectively. The other lower steering arm is supported relative to the axle housing of the tractor 1 by means of a support 20 in the form of a spacer permitting firm settings in stages.

This spacer 20 can also be transferred into a swivel position, i.e. a position where no firm setting takes place, thereby permitting a lateral movement of the two lower steering arms 4a and 4b connected to each other by means of the implement to be attached.

Figure 3:
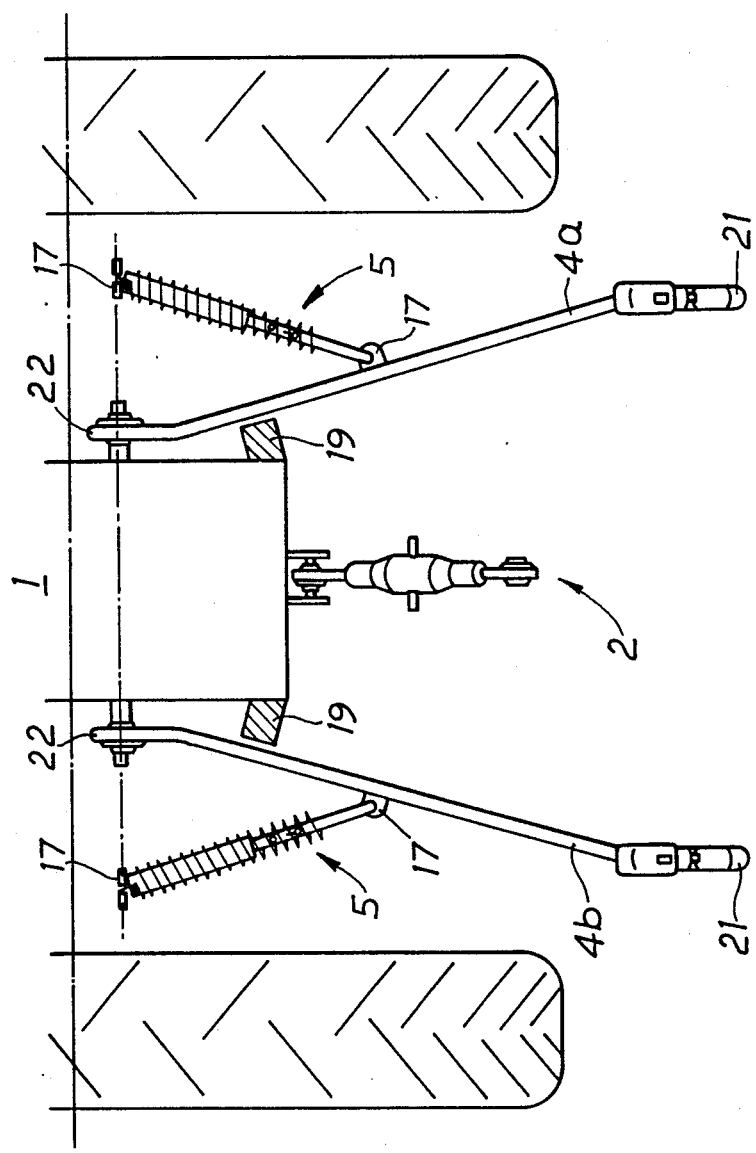
FIG. 3 is a plan view similar to FIG. 1, but with both lower steering arms each being laterally supported relative to the tractor by one holding device in accordance with the invention.

In the case of the embodiment of FIG. 2, the greatest possible lateral movement of the two lower steering arms 4a and 4b is permitted by the spacer 20. In the case of the embodiment of FIG. 3, each lower steering arm 4a and 4b has been provided with a holding device 5. The inward movement of the two lower steering arms 4a and 4b is limited by the two stops 19.

Figure 4:
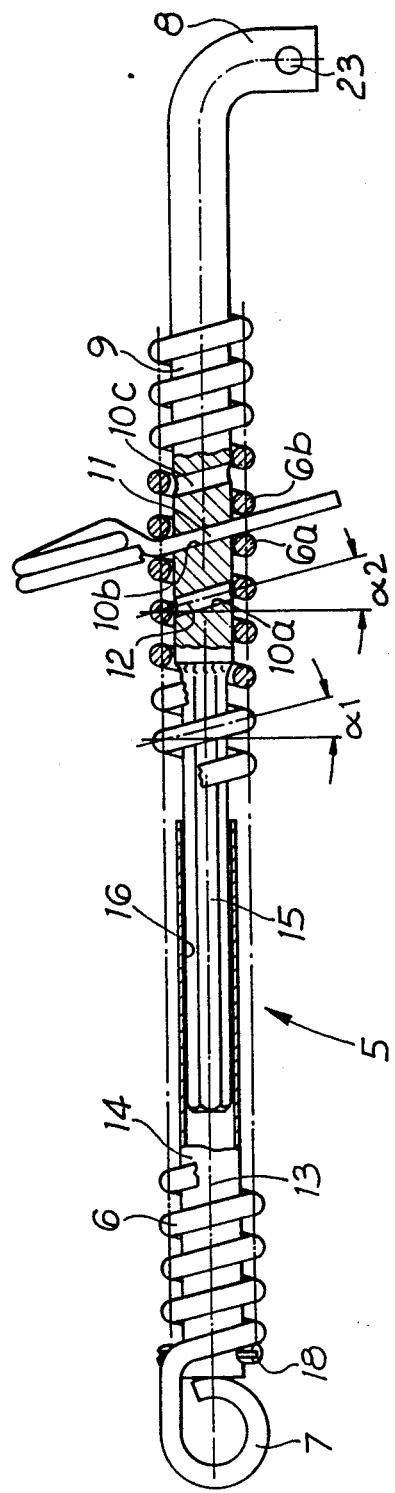
FIG. 4 shows a lateral view of the holding device, partly in section.

The design details of the holding device 5 are given in FIG. 4. The holding device 5 comprises a helical spring 6 whose one end is designed as a first connecting element in the form of a hook 7. From the end of the helical spring 6 positioned away from the first connecting element 7, an adjusting member 9 in the form of a round bar is inserted into the cavity of the spring 6. The round bar 9 is guided by the spring coils and has been provided with a guiding projection 15 designed as a profiled bar, in the present case as a bar with a hexagonal profile. The guiding projection 15 is guidingly accommodated in a correspondingly shaped bore 16 of a guiding sleeve 14. The guiding sleeve 14 is also received in the cavity of the helical spring 6, and at its end closest to the connecting element 7 it is secured by a tensioning pin 18. This tensioning pin 18 projects far enough from the guiding sleeve 14 to be able to support itself on the bent end of the helical spring 6 which forms the first connecting element 7. Upon rotation, fastening is achieved in the direction of the free end of the helical spring 6. Upon rotation in the other direction, the end of the guiding sleeve 14 is supported on the hook-shaped bent end of the first connecting element 7. The end of the adjusting member 9 projecting from the helical spring 6 is bent and forms a cylindrical journal representing the second connecting element 8. Furthermore, the second connecting element 8 has been provided with a transverse bore 23. The first connecting element 7 and the second connecting element 8 each are intended to be suspended in or inserted into eyes 17 at the lower steering arm 4 or tractor 1. The second connecting element 8 may be secured relative to the eye 17 via a pin insertable into the securing bore 23.

The adjusting member 9 has been provided with through-apertures in the form of bores 10a, 10b, 10c arranged so as to be inclined relative to the longitudinal axis 13 of the helical spring 6. The inclination of the bore axes 12 relative to a plane extending transversely to the longitudinal axis 13 of the helical spring 6 is referred to as $\alpha 2$. The angle of inclination $\alpha 2$ corresponds to the helical angle $\alpha 1$ of the coils of the helical spring 6.

The distance between two through-bores 10a, 10b, 10c differs from the distance between two coils 6a, 6b of the helical spring 6 in the normal position, i.e. in the untensioned condition. The distances are preferably selected in such a way that fine graduations are achieved similar to the Vernier effect. In the present embodiment there have been provided three through-apertures 10a to 10c. However, it is also possible to provide a larger number, but there must be a minimum of two through-bores. This design does not only permit graduation based on dimensional modules, but also intermediate settings without the two connecting elements 7 and 8 having to be released from their associated eyes.

The drawing also shows that the guiding sleeve 14 is also open at its end facing the first connecting element 7 so that any dirt which may have entered the bore 16 is pushed out by the guiding projection 15 in the direction of the connecting element 7. FIG. 4 also shows that the pin 11 which is inserted at an angle into the though-bores 10a or 10b or 10c, depending on the length to be set, and is guided between two coils 6a and 6b. It is subjected to double-selection load, i.e. with reference to the drawing plane of FIG. 4, a shear load is applied to both ends of the pin 11 projecting from the adjusting member 9. In this way, a better load distribution is achieved.

We claim:

1. A length-adjustable holding device with a resilient support for the lower steering arm of a three-point coupling device for an agricultural tractor, having a helical spring comprising a first connecting element, and an adjusting member adjustable received in the helical spring and comprising a second connecting member, with a pin being provided to secure the position of the adjusting member relative to the helical spring, which pin passes through the space between two spring coils and engages a bore of the adjusting member, wherein the adjusting member is designed with at least two through-apertures for a pin, the axis of each through-aperture extends at an angle relative to a plane transverse to the longitudinal axis of the helical spring, which angle substantially corresponds in size to the helical angle of the helical spring, the distance between the through-apertures differs from that between the coils of the helical spring, and the adjusting member is guided in a guiding bore of a guiding sleeve accommodated within the helical spring.

2. A holding device according to claim 1, wherein the adjusting member comprises a guiding projection designed as a profiled bar, especially with a hexagonal cross-section, which may be moved into the correspondingly formed bore of the guiding sleeve.

3. A holding device according to claim 1, wherein the guiding sleeve is held so as to be axially fixed and non-rotatable relative to the helical spring.

4. A holding device according to claim 1, wherein three through-apertures which are formed as bores are provided.

5. A holding device according to claim 1, when used for mutually supporting the two lower steering arms relative to each other.

6. A holding device according to claim 1, when used for supporting one lower steering arm relative to the agricultural tractor, especially its axle housing.

7. A holding device according to claim 1, wherein the one end of the helical spring has been designed as a hook for being connected to an eye of the lower steering arm or at the agricultural tractor.

8. A holding device according to claim 3, wherein the guiding sleeve is secured by a tensioning pin.

9. A holding device according to claim 1, wherein the end of the adjusting member projecting from the helical spring, for the purpose of forming the connecting element, is bent and designed as a cylindrical journal which may be inserted into an eye at the lower steering arm or at the agricultural tractor.

10. A holding device according to claim 1, wherein the axis of each through-aperture is inclined against the direction of inclination of the coils of the helical spring, starting from the connecting end.

* * * * *